US008677742B2

(12) United States Patent
Basin et al.

(10) Patent No.: US 8,677,742 B2
(45) Date of Patent: Mar. 25, 2014

(54) ACCUMULATOR WITH SOLENOID VALVE

(75) Inventors: Leonid Basin, Farmington Hills, MI (US); Fredrick R. Poskie, Plymouth, MI (US); Nieyuan Hai, Ann Arbor, MI (US); Carlos E. Marin, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 637 days.

(21) Appl. No.: 13/018,987

(22) Filed: Feb. 1, 2011

(65) Prior Publication Data

US 2011/0226346 A1 Sep. 22, 2011

Related U.S. Application Data

(60) Provisional application No. 61/314,533, filed on Mar. 16, 2010.

(51) Int. Cl.
*F16D 31/02* (2006.01)
*F16L 55/04* (2006.01)

(52) U.S. Cl.
USPC .................... 60/413; 138/30; 138/31; 60/418

(58) Field of Classification Search
USPC ................. 60/413, 415, 416, 418; 138/30, 31
See application file for complete search history.

(56) References Cited

U.S. PATENT DOCUMENTS

| | | | | |
|---|---|---|---|---|
| 4,882,975 | A * | 11/1989 | Shimamura et al. | 91/376 R |
| 7,661,442 | B2 * | 2/2010 | O'Brien et al. | 138/31 |
| 2008/0236380 | A1 * | 10/2008 | Toth et al. | 89/193 |

FOREIGN PATENT DOCUMENTS

| | | | |
|---|---|---|---|
| DE | 10116995 | B4 | 9/2008 |

* cited by examiner

*Primary Examiner* — Faris Almatrahi
*Assistant Examiner* — Daniel Collins

(57) ABSTRACT

An accumulator includes a canister, a piston, a sleeve, and a solenoid control valve assembly. The canister has an inner surface that defines an interior volume. The piston is slidably disposed within the interior volume of the canister. The piston is located between the inner surface of the canister and an outer surface of the sleeve. The piston divides the interior space into a fluid filled chamber and an air filled chamber. A fluid pathway is created by an outer surface of the sleeve and the inner surface of the canister. The fluid pathway allows fluid from an exterior source to either enter or exit the fluid chamber. The solenoid control valve assembly includes a valve body, a valve biasing member, and a plunger that is slidable within a recess of the valve body.

20 Claims, 4 Drawing Sheets

ACCUMULATOR WITH SOLENOID VALVE

CROSS-REFERENCE TO RELATED APPLICATIONS

This application claims the benefit of U.S. Provisional Application No. 61/314,533, filed on Mar. 16, 2010. The disclosure of the above application is incorporated herein by reference.

FIELD

The present disclosure relates to an accumulator, and in particular to an accumulator having a solenoid control valve assembly that regulates fluid to the accumulator.

BACKGROUND

The statements in this section merely provide background information related to the present disclosure and may or may not constitute prior art.

A typical automatic transmission includes a hydraulic control system that is used to provide lubrication, cooling, and control to various components of the transmission. A pump circulates the hydraulic fluid under pressure throughout the transmission. The pump is typically driven by the engine of the motor vehicle. During stop and start conditions, it is desirable to turn off the engine in order to maximize fuel efficiency. However, turning off the engine in turn turns off the pump. In order to prime control devices within the transmission, such as clutches and brakes, an accumulator may be employed within the hydraulic control system to provide pressurized hydraulic fluid to the control devices so that the control devices may be engaged quickly without waiting for reengagement of the pump.

Current accumulator designs use a remotely located control valve to regulate the flow of transmission fluid in and out of the accumulator, which can be costly, adds mass to the transmission, and requires additional packaging space. While these accumulator designs are useful for their intended purpose, there is room in the art for an accumulator assembly that is compact and lightweight.

SUMMARY

The present invention provides an accumulator including a canister, a piston, a sleeve, and a solenoid control valve assembly. The canister has an inner surface that defines an interior volume of the canister. The sleeve is positioned within the interior volume of the canister and has an outer surface. The piston is positioned within the interior volume. The piston has a first end and a second end. The first end of the piston is slidingly engaged with the outer surface of the sleeve and the second end of the piston is slidingly engaged with the inner surface of the canister. The piston divides the interior volume of the canister into an air filled chamber and a fluid filled chamber. The inner surface of the canister and the outer surface of the sleeve define a fluid pathway that is in fluid communication with the fluid filled chamber. The fluid pathway includes an entrance for allowing fluid to enter and exit the fluid pathway. The solenoid control valve assembly is located within the interior volume of the canister. The solenoid control valve assembly has a valve biasing member, a valve body and a plunger. The valve body has a recess located therein that is in communication with the fluid pathway and receives the valve biasing member and the plunger. The plunger is slidably engaged within the recess and is actuated by the valve body in a first direction to block the entrance of the fluid pathway. The plunger is actuated in a second direction by the valve biasing member to open the entrance of the fluid pathway.

In still another embodiment of the present invention, the canister has an end cap, an open end, and a closed end opposing the open end. The end cap seals the open end of the canister. The end cap has an inner end cap surface that further defines the interior volume of the canister.

In yet another embodiment of the present invention, a biasing member is located in the air filled chamber of the canister. The biasing member has a first end and a second end. The first end of the biasing member is engaged with the inner surface of the canister at the closed end and the second end of the biasing member is engaged with the piston. The biasing member exerts a biasing force on the piston in the direction of the open end of the canister.

In still another embodiment of the present invention, the biasing force seats the piston on a piston stop located on the inner end cap surface.

In still another embodiment of the present invention, the fluid filled chamber includes a pressure that increases as fluid enters the fluid filled chamber. The pressure creates a force in the fluid filled chamber. The force in the fluid filled chamber is greater than the biasing force of the biasing member such that the piston is urged towards the closed end of the canister.

In yet another embodiment of the present invention, the pressure in the fluid filled chamber decreases as fluid exits the fluid filled chamber. The pressure causes the force in the fluid filled chamber to decrease such that the force is less than the biasing force of the biasing member, thereby urging the piston towards the end cap.

In still another embodiment of the present invention, a supply line is received by a cavity located within the canister. The supply line is connected to the external source to provide fluid to the fluid filled chamber of the canister.

In yet another embodiment of the present invention, the supply line has a first end and a second end. The first end of the supply line connects to the external source that is a control system of an automatic transmission and the second end of the supply line is received by the cavity in the canister.

In still another embodiment of the present invention, the valve body of the solenoid control valve assembly is connected to a control module through an electrical connection. Operation of the solenoid control valve assembly is controlled by the control module.

In yet another embodiment of the present invention, the control module provides current to a solenoid coil of the valve body. The solenoid coil induces a magnetic field that actuates the plunger in the recess of the valve body in the first direction.

In still another embodiment of the present invention, the accumulator is employed within the hydraulic system of an automatic transmission. Fluid in the fluid filled chamber of the canister is a hydraulic fluid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

With reference to FIGS. 1-4, an accumulator assembly according to the principles of the present invention is generally indicated by reference number 10. The accumulator 10 is an energy storage device in which a non-compressible hydraulic fluid is held under pressure by an external source. In the example provided, the accumulator 10 is a spring type accumulator that provides a compressive force on the hydraulic fluid within the accumulator 10, as will be described in greater detail below. The accumulator 10 is preferably employed within the hydraulic control system of an automatic transmission (not shown) to enable stop-start operations, however, it should be appreciated that the accumulator 10 may be employed in various other environments, such as fuel injectors, air conditioning systems, etc., without departing from the scope of the present invention.

Figure 1:
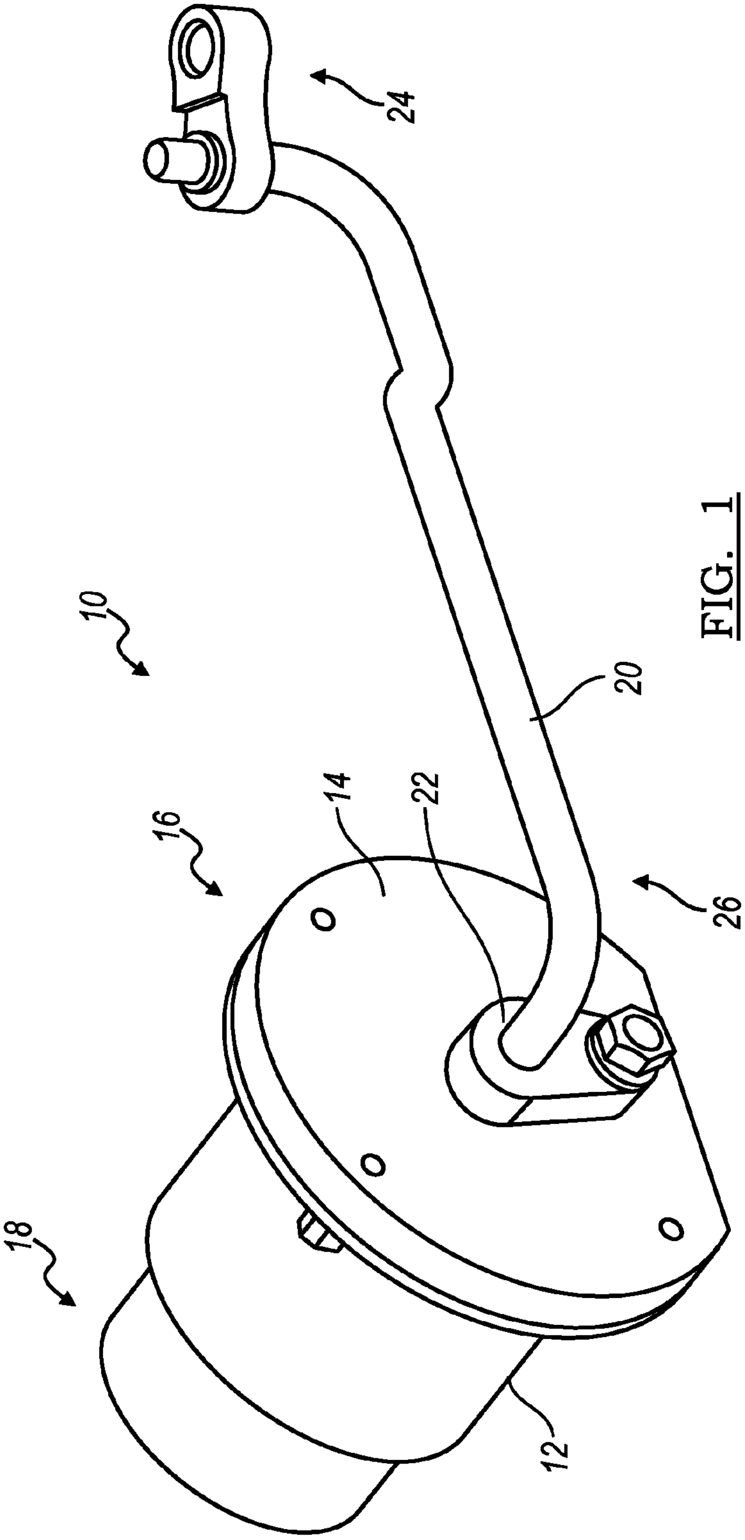
FIG. 1 is a front isometric view of an accumulator assembly according to the principles of the present invention.
Figure 2:
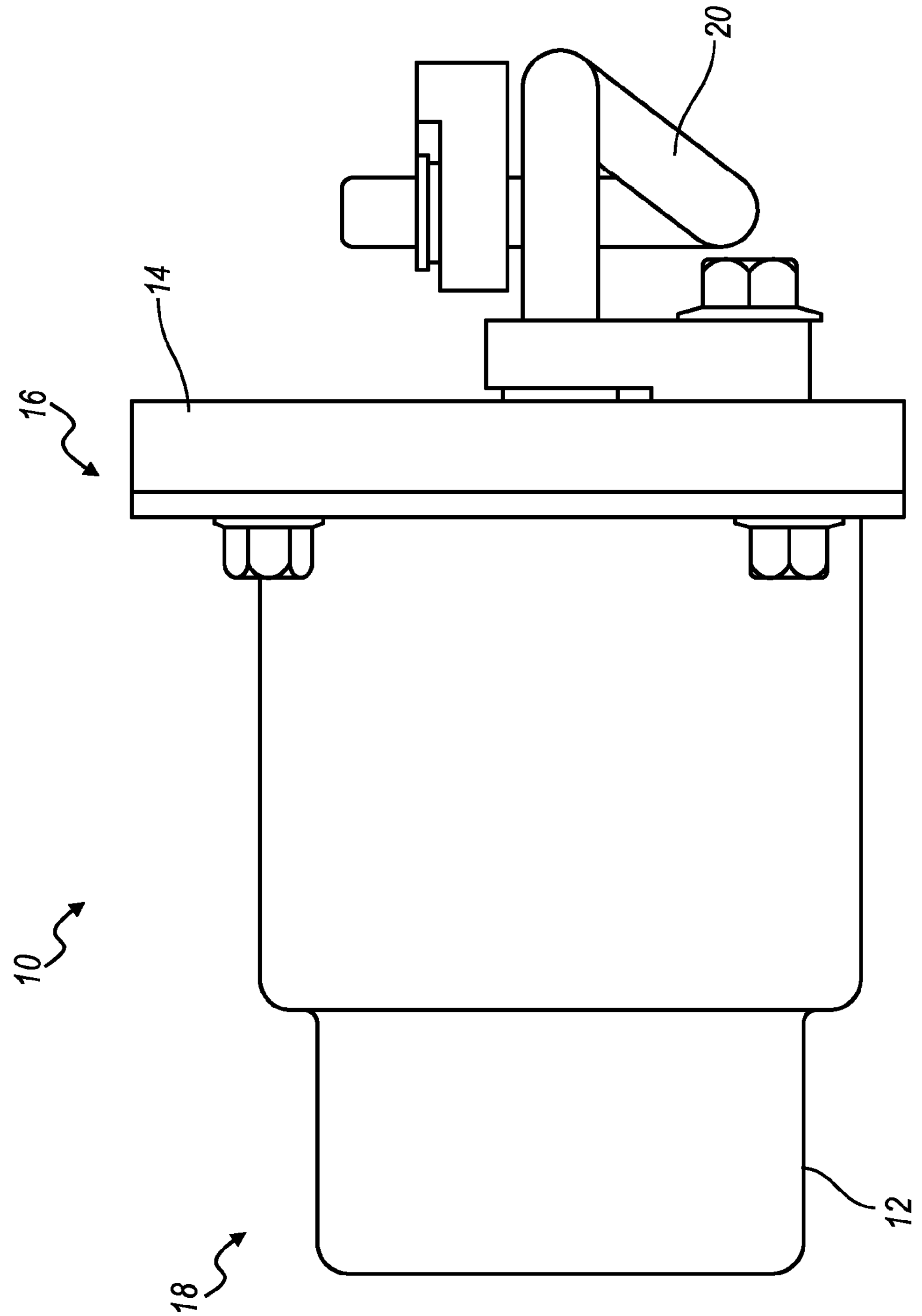
FIG. 2 is a side view of the accumulator assembly according to the principles of the present invention.
Figure 3:
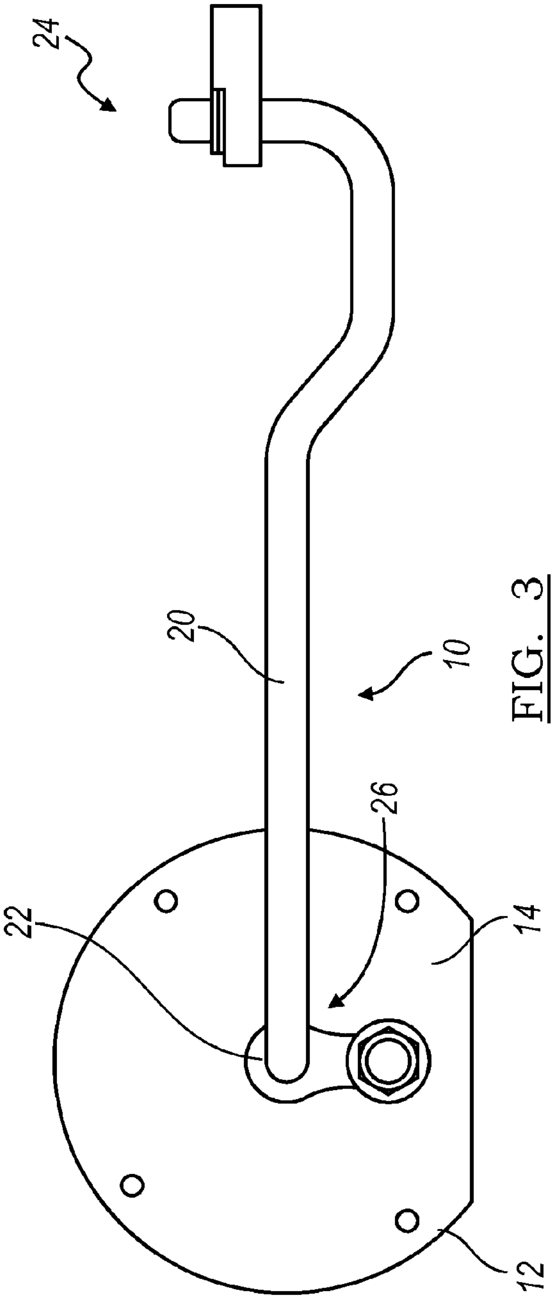
FIG. 3 is a front view of the accumulator assembly according to the principles of the present invention.
Figure 4:
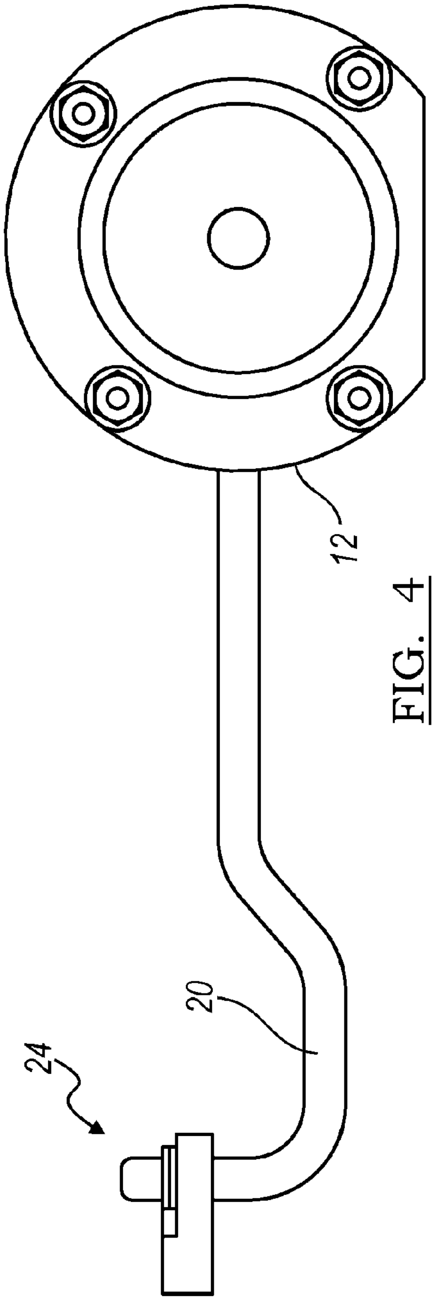
FIG. 4 is an end view of the accumulator assembly according to the principles of the present invention.
Figure 5:
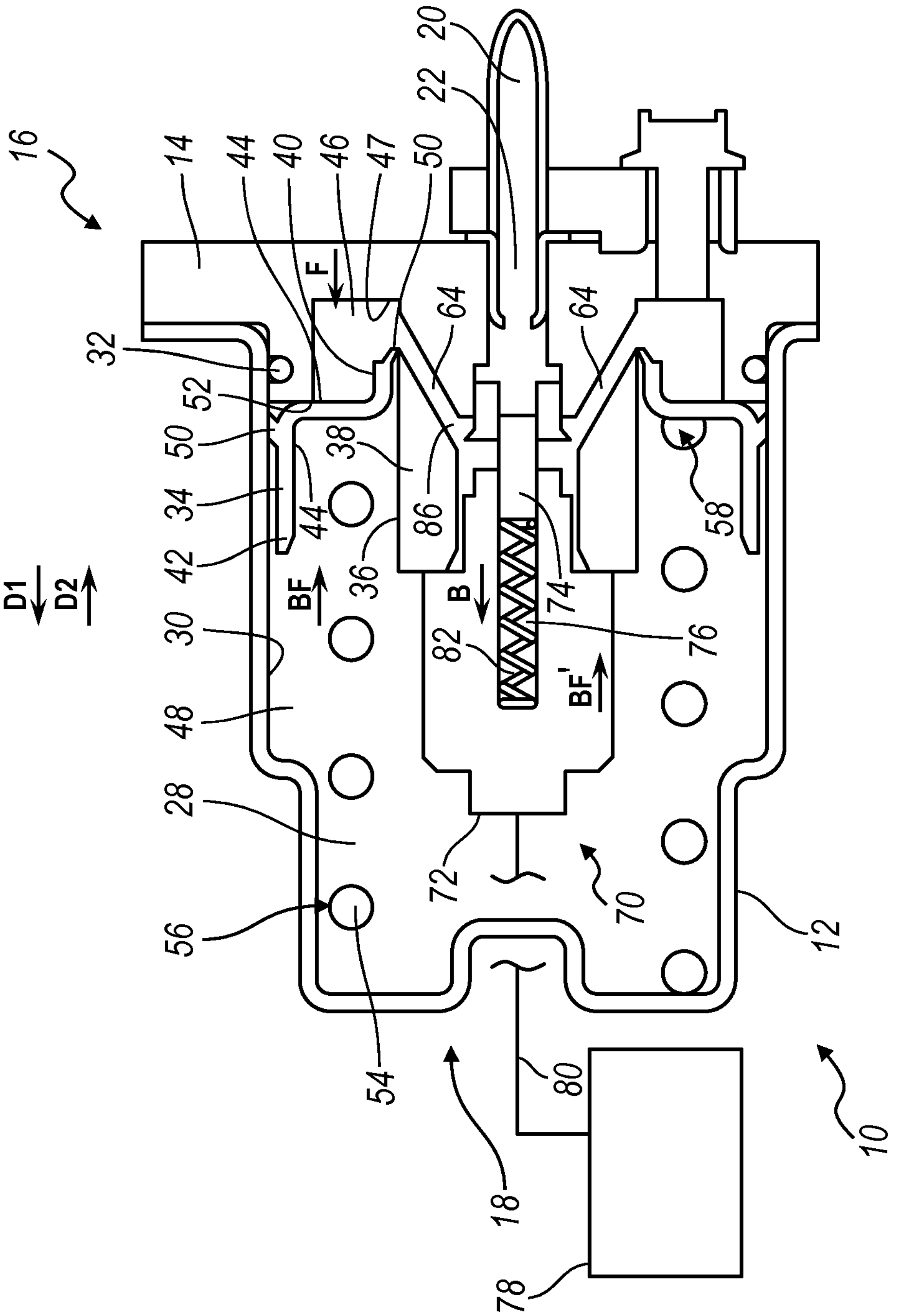
FIG. 5 is a cross sectional view of the accumulator assembly according to the principles of the present invention.

The accumulator 10 includes a pressure canister 12 and an end cap 14. The pressure canister 12 is generally cylindrical in shape and includes an open end 16 and a closed end 18 opposite the open end 16. A supply line 20 is received by a cavity 22 that is located within the end cap 14. The supply line 20 includes a first end 24 and a second end 26, where the first end 24 connects to a control system of an automatic transmission (not shown), and the second end 26 of the supply line 20 is received by the cavity 22 located within the end cap 14. Turning to FIG. 5, the canister 12 includes an interior space 28, and the open end 16 of the canister 12 is sealed by a fluid tight seal 32 that is located between an inner surface 30 of the canister 12 and the end cap 14.

The canister 12 includes a piston 34 located within the interior space 28 that is slidingly engaged with an outer surface 36 of a sleeve 38 at a first end 40 of the piston 34. A second end 42 of the piston is slidingly engaged with the inner surface 30 of the canister 12. An outer surface 44 of the piston 34 and an inner surface 47 of the end cap 14 define a fluid chamber 46. The outer surface 44 of the piston 34 and the inner surface 30 of the canister 12 define an air filled chamber 48. The piston 34 divides the interior space 28 of the canister 12 into the fluid chamber 46 and the air filled chamber 48. In the embodiment as shown, the piston 34 further includes a plurality of sealing features 50 located along the outer surface 44 that provide a fluid-tight seal between the fluid chamber 46 and the air chamber 48.

FIG. 5 illustrates the piston 34 in a seated position, where the outer surface 44 of the piston 34 is seated on a piston stop 52 of the end cap 14. The piston 34 is held in the seated position against the piston stop 52 by a biasing member 54. The biasing member 54 includes a first end 56 and a second end 58, where the first end 56 of the biasing member 54 is engaged with the inner surface 30 of the canister 12 at the closed end 18. The second end 58 of the biasing member 54 is engaged with the outer surface 44 of the piston 34. The biasing member 54 exerts a biasing force BF in a direction towards the piston 34, thereby keeping the piston 34 seated on the piston stop 52 of the end cap 14. In the embodiment as illustrated, the biasing member 54 is a coil spring, however those skilled in the art will appreciate that any type of biasing member that exerts the biasing force BF may be used as well.

The outer surface 36 of the sleeve 38 and the inner surface 47 of the end cap 14 each cooperate to define a fluid pathway 64. The fluid pathway 64 fluidly connects the supply line 20 to the fluid chamber 46. Specifically, fluid either enters or exits from the fluid chamber 46. As fluid enters the first chamber 46, the fluid chamber 46 increases in pressure such that a force F created by the pressure of the fluid chamber 46 is greater than the biasing force BF. The force F exerted by the pressure of the fluid chamber 46 overcomes the biasing force BF, thereby urging the piston 34 to move in a first direction D1, towards the closed end 18 of the canister 12. As fluid exits the fluid chamber 46, the fluid chamber 46 decreases in pressure such that the force F exerted by the fluid chamber 46 is now less than the biasing force BF, and the piston 34 is urged in a second direction D2 towards the end cap 14 of the canister 12.

A solenoid control valve assembly 70 is operable to control the amount of fluid that is stored within the fluid chamber 46. The solenoid control valve assembly 70 includes a valve body 72 and a plunger 74, where a portion of the valve body is received by the sleeve 38. Operation of the solenoid control valve assembly 70 is controlled by a control module 78, where the control module 78 is connected to the valve body 72 through an electrical connection 80. The control module 78 is used to supply electricity to the valve body 72 depending on vehicle parameters such as engine or transmission torque or speed, and is preferably an electronic control device having a preprogrammed digital computer or processor, control logic, memory used to store data, and at least one I/O peripheral. The control logic includes a plurality of logic routines for monitoring, manipulating, and generating data.

The plunger 74 is received by a recess 76 located within the valve body 72, and a slidable within the recess 76 in the directions D1 and D2. Specifically, the valve body 72 includes a solenoid coil (not shown), where current is provided to the solenoid coil by the control module 78. The current flows through the solenoid coil to induce a magnetic field B. The magnetic field B actuates the plunger 74 within the recess 76 in the direction D1, away from the end cap 14. The plunger 74 is constructed from any type of ferromagnetic material that responds to the magnetic field B such as, for example, an iron-based material, a nickel-based material, or a cobalt-based material. When electrical current no longer flows through the solenoid coil, the magnetic field B no longer exists, and the plunger 74 is no longer actuated through the solenoid coil. Instead, a biasing member 82 that is seated within the recess 76 of the valve body 72 exerts a biasing force BF' that urges the plunger 74 in the direction D2.

The plunger 74 is actuated in the directions D1 and D2 to open and close an entrance 86 to the fluid pathway 64. Specifically, when the valve body 72 actuates the plunger 74 in the direction D1, the plunger 74 blocks the entrance 86 such that fluid is unable to either enter or leave the fluid chamber 46. When electric current no longer flows through the solenoid coil, the magnetic field B no longer exists, and the plunger 74 is urged by the biasing member 82 in the direction D2, thereby opening the entrance 86. When opened, the entrance 86 allows for fluid to either enter or leave the fluid chamber 46, depending on the pressure in the supply line 20.

Packaging the solenoid control valve assembly 70 within the canister 12 of the accumulator 10 will provide protection to the solenoid control valve assembly 70. Some types of accumulator assemblies that are currently available employ a separate control valve to regulate fluid flow. The accumulator 10 includes the solenoid control valve assembly 70 packaged within the interior of the canister 12, which protects the solenoid control valve assembly and reduces mass and the amount of packaging space needed.

The description of the invention is merely exemplary in nature and variations that do not depart from the gist of the invention are intended to be within the scope of the invention. Such variations are not to be regarded as a departure from the spirit and scope of the invention.

What is claimed is:

1. An accumulator for accumulating fluid from an external source, comprising:

a canister having an inner surface, wherein the inner surface defines an interior volume of the canister;

a sleeve positioned within the interior volume of the canister, wherein the sleeve has an outer surface;

a piston positioned within the interior volume, wherein the piston has a first end and a second end, wherein the first end of the piston is slidingly engaged with the outer surface of the sleeve and the second end of the piston is slidingly engaged with the inner surface of the canister, and wherein the piston divides the interior volume of the canister into an air filled chamber and a fluid filled chamber, and wherein the inner surface of the canister and the outer surface of the sleeve define a fluid pathway that is in fluid communication with the fluid filled chamber, wherein the fluid pathway includes an entrance for allowing fluid to enter and exit the fluid pathway; and a solenoid control valve assembly located within the interior volume of the canister, the solenoid control valve assembly having a valve biasing member, a valve body and a plunger, and wherein the valve body has a recess located therein that is in communication with the fluid pathway and receives the valve biasing member and the plunger, wherein the plunger is slidably engaged within the recess and is actuated by the valve body in a first direction to block the entrance of the fluid pathway, and wherein the plunger is actuated in a second direction by the valve biasing member to open the entrance of the fluid pathway.

2. The accumulator of claim 1 wherein the canister has an end cap, an open end, and a closed end opposing the open end, wherein the end cap seals the open end of the canister, and wherein the end cap has an inner end cap surface that further defines the interior volume of the canister.

3. The accumulator of claim 2 comprising a biasing member located in the air filled chamber of the canister, wherein the biasing member has a first end and a second end, wherein the first end of the biasing member is engaged with the inner surface of the canister at the closed end and the second end of the biasing member is engaged with the piston, and wherein the biasing member exerts a biasing force on the piston in the direction of the open end of the canister.

4. The accumulator of claim 3 wherein the biasing force seats the piston on a piston stop located on the inner end cap surface.

5. The accumulator of claim 3 wherein the fluid filled chamber includes a pressure that increases as fluid enters the fluid filled chamber, and wherein the pressure creates a force in the fluid filled chamber, and wherein the force in the fluid filled chamber is greater than the biasing force of the biasing member such that the piston is urged towards the closed end of the canister.

6. The accumulator of claim 5 wherein the pressure in the fluid filled chamber decreases as fluid exits the fluid filled chamber, and wherein the pressure causes the force in the fluid filled chamber to decrease such that the force is less than the biasing force of the biasing member, thereby urging the piston towards the end cap.

7. The accumulator of claim 1 wherein a supply line is received by a cavity located within the canister, and wherein the supply line is connected to the external source to provide fluid to the fluid filled chamber of the canister.

8. The accumulator of claim 7 wherein the supply line has a first end and a second end, wherein the first end of the supply line connects to the external source that is a control system of an automatic transmission and the second end of the supply line is received by the cavity in the canister.

9. The accumulator of claim 1 wherein the valve body of the solenoid control valve assembly is connected to a control module through an electrical connection, and wherein operation of the solenoid control valve assembly is controlled by the control module.

10. The accumulator of claim 9 wherein the control module provides current to a solenoid coil of the valve body, and wherein the solenoid coil induces a magnetic field that actuates the plunger in the recess of the valve body in the first direction.

11. The accumulator of claim 1 wherein the accumulator is employed within the hydraulic system of an automatic transmission, and wherein fluid in the fluid filled chamber of the canister is a hydraulic fluid.

12. An accumulator for accumulating fluid from an external source, comprising:

a canister having an inner surface, an end cap, an open end, and a closed end opposing the open end, wherein the end cap seals the open end of the canister, and wherein the end cap has an inner end cap surface, wherein the inner surface and the inner end cap surface both define an interior volume of the canister;

a sleeve positioned within the interior volume of the canister, wherein the sleeve has an outer surface;

a piston positioned within the interior volume, wherein the piston has a first end and a second end, wherein the first end of the piston is slidingly engaged with the outer surface of the sleeve and the second end of the piston is slidingly engaged with the inner surface of the canister, and wherein the piston divides the interior volume of the canister into an air filled chamber and a fluid filled chamber, and wherein the inner surface of the canister and the outer surface of the sleeve define a fluid pathway that is in fluid communication with the fluid filled chamber, wherein the fluid pathway includes an entrance for allowing fluid to enter and exit the fluid pathway;

a biasing member located in the air filled chamber of the canister, wherein the biasing member has a first end and a second end, wherein the first end of the biasing member is engaged with the inner surface of the canister at the closed end and the second end of the biasing member is engaged with the piston, and wherein the biasing member exerts a biasing force on the piston in the direction of the open end of the canister; and a solenoid control valve assembly located within the interior volume of the canister, the solenoid control valve assembly having a valve biasing member, a valve body and a plunger, and wherein the valve body has a recess located therein that is in communication with the fluid pathway and receives the valve biasing member and the plunger, wherein the plunger is slidably engaged within the recess and is actuated by the valve body in a first direction to block the entrance of the fluid pathway, and wherein the plunger is actuated in a second direction by the valve biasing member to open the entrance of the fluid pathway.

13. The accumulator of claim 12 wherein the biasing force seats the piston on a piston stop located on the inner end cap surface.

14. The accumulator of claim 12 wherein the fluid filled chamber includes a pressure that increases as fluid enters the fluid filled chamber, and wherein the pressure creates a force in the fluid filled chamber, and wherein the force in the fluid filled chamber is greater than the biasing force of the biasing member such that the piston is urged towards the closed end of the canister.

15. The accumulator of claim 14 wherein the pressure in the fluid filled chamber decreases as fluid exits the fluid filled chamber, and wherein the pressure causes the force in the fluid filled chamber to decrease such that the force is less than the biasing force of the biasing member, thereby urging the piston towards the end cap.

16. The accumulator of claim 12 wherein a supply line is received by a cavity located within the end cap of the canister, and wherein the supply line is connected to the external source to provide fluid to the fluid filled chamber of the canister.

17. The accumulator of claim 12 wherein the supply line has a first end and a second end, wherein the first end of the supply line connects to the external source that is a control system of an automatic transmission and the second end of the supply line is received by the cavity in the end cap.

18. The accumulator of claim 12 wherein the valve body of the solenoid control valve assembly is connected to a control module through an electrical connection, and wherein operation of the solenoid control valve assembly is controlled by the control module.

19. The accumulator of claim 18 wherein the control module provides current to a solenoid coil of the valve body, and wherein the solenoid coil induces a magnetic field that actuates the plunger in the recess of the valve body in the first direction.

20. An accumulator employed within the hydraulic system of an automatic transmission, wherein the accumulator is for accumulating hydraulic fluid from a control system of the automatic transmission, comprising:

a canister having an inner surface, an end cap, an open end, and a closed end opposing the open end, wherein the end cap seals the open end of the canister, and wherein the end cap has an inner end cap surface and a cavity, wherein the inner surface and the inner end cap surface both define an interior volume of the canister;

a sleeve positioned within the interior volume of the canister, wherein the sleeve has an outer surface;

a piston positioned within the interior volume, wherein the piston has a first end and a second end, wherein the first end of the piston is slidingly engaged with the outer surface of the sleeve and the second end of the piston is slidingly engaged with the inner surface of the canister, and wherein the piston divides the interior volume of the canister into an air filled chamber and a fluid filled chamber, and wherein the inner surface of the canister and the outer surface of the sleeve define a fluid pathway that is in fluid communication with the fluid filled chamber, wherein the fluid pathway includes an entrance for allowing fluid to enter and exit the fluid pathway;

a biasing member located in the air filled chamber of the canister, wherein the biasing member has a first end and a second end, wherein the first end of the biasing member is engaged with the inner surface of the canister at the closed end and the second end of the biasing member is engaged with the piston, and wherein the biasing member exerts a biasing force on the piston in the direction of the open end of the canister;

a supply line received by the cavity located within the end cap of the canister, and wherein the supply line has a first end and a second end, wherein the first end of the supply line connects to the control system of the automatic transmission and the second end of the supply line is received by the cavity in the end cap; and a solenoid control valve assembly located within the interior volume of the canister, the solenoid control valve assembly having a valve biasing member, a valve body and a plunger, and wherein the valve body has a recess located therein that is in communication with the fluid pathway and receives the valve biasing member and the plunger, wherein the plunger is slidably engaged within the recess and is actuated by the valve body in a first direction to block the entrance of the fluid pathway, and wherein the plunger is actuated in a second direction by the valve biasing member to open the entrance of the fluid pathway.

* * * * *